(12) United States Patent
Ogata et al.

(10) Patent No.: US 10,590,850 B2
(45) Date of Patent: Mar. 17, 2020

(54) BURNER, COMBUSTOR, AND GAS TURBINE

(71) Applicant: KAWASAKI JUKOGYO KABUSHIKI KAISHA, Hyogo (JP)

(72) Inventors: Masahiro Ogata, Kobe (JP); Takeo Oda, Kobe (JP); Yasuhiro Kinoshita, Kobe (JP); Kohshi Hirano, Kakogawa (JP); Takahiro Uto, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 306 days.

(21) Appl. No.: 15/523,824

(22) PCT Filed: Nov. 4, 2015

(86) PCT No.: PCT/JP2015/081062
§ 371 (c)(1),
(2) Date: May 2, 2017

(87) PCT Pub. No.: WO2016/072423
PCT Pub. Date: May 12, 2016

(65) Prior Publication Data
US 2017/0321609 A1   Nov. 9, 2017

(30) Foreign Application Priority Data

Nov. 5, 2014   (JP) ................. 2014-225173

(51) Int. Cl.
*F02C 7/228*   (2006.01)
*F23R 3/28*   (2006.01)
(Continued)

(52) U.S. Cl.
CPC ............... *F02C 7/228* (2013.01); *F02C 3/04* (2013.01); *F02C 7/22* (2013.01); *F02C 7/222* (2013.01);
(Continued)

(58) Field of Classification Search
CPC .. F02C 7/22; F02C 7/222; F02C 7/228; F05D 2240/36; F23D 11/443; F23D 14/02; F23D 14/08; F23D 3/28; F23D 3/283; F23D 3/286; F23D 3/30; F23D 3/34; F23D 3/346; F23D 3/36; F23D 3/44; F23R 2900/03341; F23R 2900/03343
See application file for complete search history.

(56) References Cited

U.S. PATENT DOCUMENTS

2010/0263383 A1   10/2010   York et al.
2011/0000214 A1   1/2011   Helmick et al.
(Continued)

FOREIGN PATENT DOCUMENTS

CN   104110699 A   10/2014
JP   H05-187637 A   7/1993
(Continued)

OTHER PUBLICATIONS

International Search Report issued in PCT/JP2015/081062; dated Jan. 19, 2016.

*Primary Examiner* — Scott J Walthour
(74) *Attorney, Agent, or Firm* — Studebaker & Brackett PC (57) ABSTRACT

A burner injects a mixture of fuel and air from a base end side far from a combustion chamber toward a distal end side close to the combustion chamber. The burner has a fuel passage having a turn-back part turning back and channeling the fuel between the base end side and the distal end side. The burner has a premixed gas passage formed to surround the fuel passage. The burner has a fuel introduction part introducing the fuel channeled through the fuel passage into the premixed gas passage from the base end side to the distal end side. The burner has an air supply part supplying the premixed gas passage with air on the base end side.

13 Claims, 10 Drawing Sheets

(51) Int. Cl.
    *F23R 3/36*     (2006.01)
    *F02C 7/22*     (2006.01)
    *F23R 3/34*     (2006.01)
    *F23R 3/30*     (2006.01)
    *F02C 3/04*     (2006.01)
    *F23R 3/44*     (2006.01)

(52) U.S. Cl.
    CPC ............... *F23R 3/28* (2013.01); *F23R 3/286* (2013.01); *F23R 3/30* (2013.01); *F23R 3/34* (2013.01); *F23R 3/346* (2013.01); *F23R 3/36* (2013.01); *F23R 3/44* (2013.01); *F05D 2220/32* (2013.01); *F05D 2240/35* (2013.01)

(56) References Cited

U.S. PATENT DOCUMENTS

| | | |
|---|---|---|
| 2011/0094234 A1 | 4/2011 | Khan et al. |
| 2011/0265485 A1 | 11/2011 | Stoia et al. |
| 2011/0296839 A1* | 12/2011 | Van Nieuwenhuizen ............... F23R 3/286 60/737 |
| 2014/0182294 A1 | 7/2014 | Matsumoto et al. |

FOREIGN PATENT DOCUMENTS

| | | |
|---|---|---|
| JP | H10-026352 A | 1/1998 |
| JP | 2010-249496 A | 11/2010 |
| JP | 2011-089761 | 5/2011 |
| WO | 2013/035474 A1 | 3/2013 |

\* cited by examiner

BURNER, COMBUSTOR, AND GAS TURBINE

CROSS-REFERENCE TO RELATED APPLICATIONS

This is a national phase application in the United States of International Patent Application No. PCT/JP2015/081062 with an international filing date of Nov. 4, 2015, which claims priority of Japanese Patent Application No. 2014-225173 filed on Nov. 5, 2014 the contents of which are incorporated herein by reference.

TECHNICAL FIELD

The present invention relates to a burner, a combustor, and a gas turbine.

BACKGROUND ART

Gas turbines include a gas turbine having a combustor (DLE combustor) adopting a lean premixed combustion method (Dry Low Emission combustion method). In this combustion method, in a premixed combustion system combusting a premixed gas acquired by premixing fuel and air, the premixed gas is made leaner to suppress an amount of emission of NOx harmful to the environment. A tight regulation is imposed on the amount of NOx emission, and this regulation on the amount of emission leads to a limitation on a load range of fuel to be combusted and a limitation on a range of use of a burner. Therefore, the lean premixed combustion method is effective in that the range of use of a burner can be expanded in this way.

With regard to the gas turbine, from the viewpoints of prevention of global warming and effective use of resources, it is requested to use a byproduct hydrogen gas secondarily generated from a manufacturing process of a petrochemical plant etc. in addition to a natural gas that is a main fuel of the gas turbine.

However, the hydrogen gas has a faster combustion speed than the natural gas. Therefore, a burner combusting a fuel containing the hydrogen gas has a higher possibility of a flame entering a burner premixed gas passage (this phenomenon is referred to as "flashback") and causing a burnout of the burner main body as compared to a burner combusting only the natural gas.

To solve this problem, JP 10-26352 A discloses a premix combustor for a gas turbine incorporating a flashback prevention technique. This premix combustor has a cooling flow path provided in the vicinity of a wall surface of an injection port (annular nozzle) of a premixed gas, and a coolant such as water is circulated in this cooling flow path to form a low temperature flame extinguishing region in the vicinity of the wall surface so as to extinguish the flame entering the inside of the injection port.

However, the premix combustor disclosed in JP 10-26352 A requires a large number of pieces of equipment such as a coolant flow path and a coolant circulation amount control means.

SUMMARY OF THE INVENTION

Problem to be Solved by the Invention

Therefore, a problem to be solved by the present invention is to provide a burner, a combustor, and a gas turbine capable of preventing a flashback with a simple structure.

Means for Solving Problem

A first aspect of the present invention provides a burner injecting a mixture of fuel and air from a base end side far from a combustion chamber toward a distal end side close to the combustion chamber, comprising a fuel passage having a turn-back part turning back and channeling the fuel between the base end side and the distal end side; a premixed gas passage formed to surround the fuel passage; a fuel introduction part introducing the fuel channeled through the fuel passage into the premixed gas passage from the base end side to the distal end side; and an air supply part supplying the premixed gas passage with air on the base end side.

According to this burner, since a low-temperature fuel such as a hydrogen gas is channeled through the turn-back part provided in the fuel passage, the outer circumference of the fuel passage can sufficiently be cooled. Therefore, even if a flame enters the premixed gas passage (the inside of a burner main body) formed to surround the fuel passage, the flame is extinguished when interfering with the outer circumference of the fuel passage, and a flashback can therefore be prevented. In this way, the flashback can efficiently be prevented with a simple configuration by effectively utilizing the fuel for cooling.

This burner may comprise a fuel supply part supplying the fuel passage with a multiple fuel including a hydrogen gas.

According to this burner, since the turn-back part is provided to form a long flow path length through which the fuel flows, mixing with other fuels can be promoted even if a light-weight hard-to-mix hydrogen gas is used.

Preferably, the fuel passage has at least one communication part allowing communication between the fuel passage before the passing of the fuel through the turn-back part and the fuel passage after the passing.

According to this burner, by providing in addition to the turn-back part a portion allowing communication between the fuel passage before the passing of the fuel through the turn-back part and the fuel passage after the passing, the fuel can reliably flow. Additionally, the presence of a plurality of the communication parts can promote formation of a turbulence flow and can promote mixing of fuel.

Preferably, the turn-back part has at least one communication part supplying the combustion chamber with a portion of the fuel flowing through the turn-back part.

According to this burner, since the fuel concentration in the premixed gas passage can be reduced, NOx emission can further be suppressed and the usable range can be expanded. Specifically, the fuel is diffusely injected from the distal end side of the burner into the combustion chamber at a level which has no effect on the NOx emission (e.g., within 20% of the fuel used). As a result, an amount of fuel introduced from the fuel introduction part into the premixed gas passage decreases and the premixed gas in the premixed gas passage can further be made leaner. Therefore, since the amount of NOx emissions can further be reduced and the fuel load range can be expanded, the usable range of the burner can be expanded.

Preferably, the premixed gas passage included in this burner has a transverse section, the area of which is gradually reduced from the base end side to the distal end side.

According to this burner, since the flow passage area on the transverse section of the premixed gas passage is gradually reduced from the base end side to the distal end side, the outlet flow speed (injection speed) of the premixed gas can be increased. The flashback occurs when the combustion speed exceeds the injection speed of the premixed gas.

Therefore, the flashback can be prevented by increasing the injection speed of the premixed gas. Additionally, by increasing the injection speed, a viscous boundary layer region near a wall surface of the premixed gas passage can be reduced. The viscous boundary layer region is one of the factors which causes the flashback, and reducing this region is effective to prevent the flashback.

Preferably, the fuel introduction part included in this burner includes a coupling chamber accommodating the fuel that reached the base end side after passing through the fuel passage, and a plurality of injection holes injecting the fuel from the coupling chamber into the premixed gas passage.

According to this burner, since the inclusion of the communication chamber in the fuel introduction part can promote mixing of the fuel and the inclusion of the injection hole enables injection of the fuel into the premixed gas passage, the uniform mixing of the premixed gas can be promoted. Therefore, the insufficient stirring and mixing in the premixed gas passage can be prevented, and the mixing of the fuel and the combustion air can be promoted. In this way, the formation of a localized high-temperature region can be prevented from being generated during combustion, and an increase in NOx emission can be suppressed.

A second aspect of the present invention provides a combustor supplying a combustion product gas to a turbine, the combustor comprising a combustion cylinder forming the combustion chamber combusting a fuel; a premixed combustion type main burner disposed upstream of the combustion cylinder; and a premixed combustion type supplemental burner disposed penetrating through a circumferential wall part on the downstream side of the combustor, wherein the supplemental burner is any one of the burners described above.

A third aspect of the present invention provides a gas turbine comprising any of the combustors described above.

Effect of the Invention

According to the present invention, by cooling a component in the burner with the introduced fuel, a flame is extinguished by this cooled component even if the flame enters the inside of the burner main body, therefore the flashback can be prevented using a simple configuration.

MODES FOR CARRYING OUT THE INVENTION

Embodiments of the present invention will now be described with reference to the accompanying drawings. The following description is merely an exemplification of a form of the present invention and is not intended to limit the present invention, an application thereof, or a use thereof.

First Embodiment

Respective configurations of a gas turbine 2, a combustor 4, and a burner (supplemental burner) 6 of the present invention will be described with reference to FIGS. 1 to 5.

Figure 1:
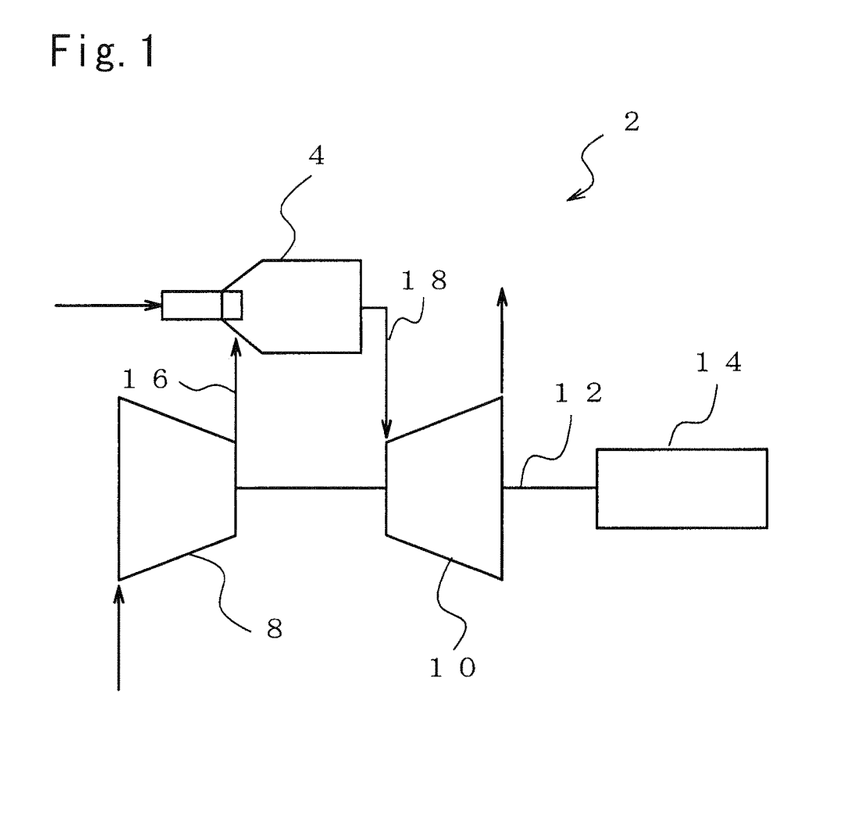
FIG. 1 is a schematic configuration diagram of a gas turbine according to the present invention.

The configuration of the gas turbine 2 will be described with reference to FIG. 1. FIG. 1 is a schematic configuration diagram of the gas turbine 2 of the present invention. The gas turbine 2 includes a compressor 8, a combustor 4, a turbine 10, a rotor 12, and a generator 14. The compressor 8 is connected to the combustor 4 through an air supply path 16 for supplying a compressed air. The combustor 4 is connected to the turbine 10 through an air supply path 18 for supplying a high-temperature high-pressure combustion product gas (hereinafter referred to as "combustion exhaust gas"). The turbine 10 is mechanically connected to the rotor 12, so that the rotation of the rotor 12 transmitted to the compressor 8 and the generator 14.

An operation of the gas turbine 2 with the configuration described above will be described. In this gas turbine 2, the compressor 8 sucks an atmospheric air to generate a compressed air. The compressed air is combusted together with a fuel in the combustor 4 to generate a high-temperature high-pressure combustion exhaust gas. The combustion exhaust gas is supplied to the turbine 10 and used for rotating the rotor 12. The rotation of the rotor 12 is transmitted to the compressor 8 and used for generating the compressed air. By the rotation of the rotor 12, the generator 14 is driven to generate electric power.

Figure 2:
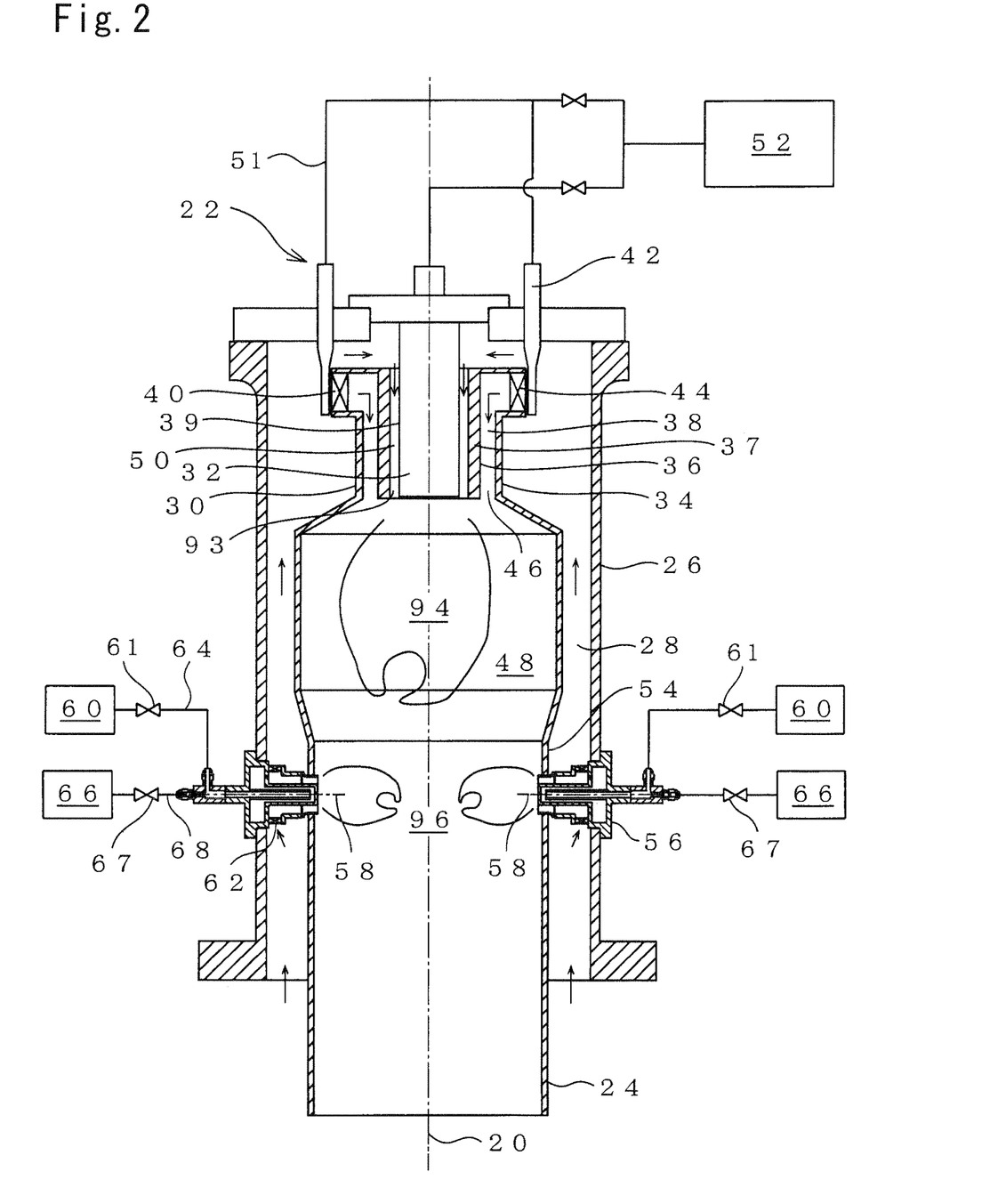
FIG. 2 is a schematic longitudinal sectional view of a combustor according to the present invention.

The configuration of the combustor 4 will be described with reference to FIG. 2. FIG. 2 is a schematic configuration diagram of the combustor 4 of the present invention. The combustor 4 of this embodiment is a reverse-flow can-type combustor 4 in which the flow direction of the compressed air introduced from the compressor 8 (a direction from the top to the bottom of FIG. 2) and the flow direction of the combustion exhaust gas (a direction from the bottom to the top of FIG. 2) are opposed to each other. The type of the combustor 4 may be an annular type having a plurality of fuel injection valves on a circumference.

The combustor 4 has a burner unit 22, a combustion cylinder 24, and a casing 26 concentrically arranged around a central axis 20. The burner unit 22 is arranged on the central axis 20. The combustion cylinder 24 forms a combustion chamber 48 therein for combusting a fuel etc. injected from the burner unit 22. The casing 26 is cylindrical and surrounds the burner unit 22 and the combustion cylinder 24 to form an annular combustion air flow path 28 around the burner unit 22 and the combustion cylinder 24. The casing 26 and the combustion cylinder 24 support a plurality of supplemental burners 6. In this embodiment, the four supplemental burners 6 are arranged at equal intervals on a circumference around the central axis 20 on a plane orthogonal to the central axis 20. The configuration of the supplemental burners 6 will be described in detail later.

The burner unit 22 is made up of a premixing type main burner 30 and a diffusion combustion type pilot burner 32. The pilot burner 32 is disposed along the central axis 20. The main burner 30 is concentrically disposed around the pilot burner 32. The main burner 30 and the pilot burner 32 are in communication with a first fuel supply source 52 through a piping 51.

The main burner 30 has an outer cylinder 34 and an inner cylinder 36 arranged concentrically along the central axis 20. In this embodiment, as shown in the figure, the inner cylinder 36 also serves as a combustion air injection cylinder 37 of the pilot burner 32 described later. An annular space between the outer cylinder 34 and the inner cylinder 36 is used as a premixing flow path 38 for mixing the fuel and the combustion air. The premixing flow path 38 has one end (an upper end portion of the figure) opened to the combustion chamber 48 and the other end (a lower end portion of the figure) opened outward in the radial direction through a plurality of air intake ports 40 to the combustion air flow path 28. A plurality of main fuel nozzles 42 injecting a first fuel is arranged radially outside the air intake ports 40. Although not shown, preferably, the plurality of the air intake ports 40 and the plurality of the main fuel nozzles 42 corresponding thereto are arranged at regular intervals in the circumferential direction around the central axis 20. Although not shown, the main fuel nozzles 42 each have a plurality of fuel injection holes (not shown) formed at a position facing the air intake port 40 to inject the first fuel toward the air intake port 40 and are connected to the first fuel supply source 52 through the piping 51, so that the fuel supplied from the first fuel supply source 52 is supplied from the air intake ports 40 to the premixing flow path 38 along with the combustion air supplied from the combustion air flow path 28 and mixed in the premixing flow path 38, and the mixed fuel and combustion air are injected into the combustion chamber 48. In this embodiment, a plurality of swirl vanes (swirlers) 44 is provided in the air intake ports 40 to impart a swirling force to the combustion air flowing into the premixing flow path 38 so as to promote premixing with the first fuel.

The pilot burner 32 includes a fuel injection cylinder 39 extending along the central axis 20 and the combustion air injection cylinder 37 coaxially covering the fuel injection cylinder 39, and a fuel injection path (not shown) formed in the fuel injection cylinder 39 is connected to the first fuel supply source 52 through the piping 51, while an annular air flow path (pilot air flow path) 50 formed between the fuel injection cylinder 39 and the combustion air injection cylinder 37 is connected to the combustion air flow path 28, so that the fuel supplied from the first fuel supply source 52 and the compressed air supplied from the compressor are injected into the combustion chamber 48.

The supplemental burners 6 are arranged penetrating through the outer casing 26 and the inner combustion cylinder 24 along four axes 58 that are included on a plane orthogonal to the central axis 20 and that are circumferentially arranged at equal intervals. As described in detail later, the supplemental burners 6 are connected to a first fuel supply source (natural gas supply source) 60 and a second fuel supply source (hydrogen gas supply source) 66. The supplemental burners 6 are configured to take in as a combustion air a portion of the compressed air flowing through the combustion air flow path 28.

The operation of the combustor 4 having the configuration described above will hereinafter be described with reference to FIG. 2. As shown in FIG. 2, when a gas turbine (not shown) is started, the natural gas injected from the pilot burner 32 into the combustion chamber 48 is diffusely mixed in the combustion chamber 48 with the combustion air injected from the annular air flow path 50 into the combustion chamber 48 and is ignited by an ignition source not shown to form a pilot flame from diffusion combustion.

When the gas turbine shifts to a normal operation, the premixed gas injected from the premixing flow path 38 of the main burner 30 is ignited by the pilot flame in the combustion chamber 48 to forma lean premixed flame in a primary combustion region 94 in the base end side of the combustion chamber. As a result, the combustion flame temperature in the combustion chamber 48 decreases and an amount of generation of NOx is suppressed.

When high-load combustion is requested so as to raise the output of the gas turbine, the supplemental burners 6 are operated to introduce a premixed gas composed of a natural gas, a hydrogen gas, and a combustion air from the supplemental burners 6 into the combustion chamber 48, and lean premixed flames are formed in a secondary combustion region 96 in the downstream side of the primary combustion region 94. As a result, the generation of NOx is suppressed in the secondary combustion region 96. The combustion exhaust gas increased by combusting the premixed gas introduced from the supplemental burners 6 is sent to the gas turbine and used for output adjustment of the gas turbine.

Figure 3:
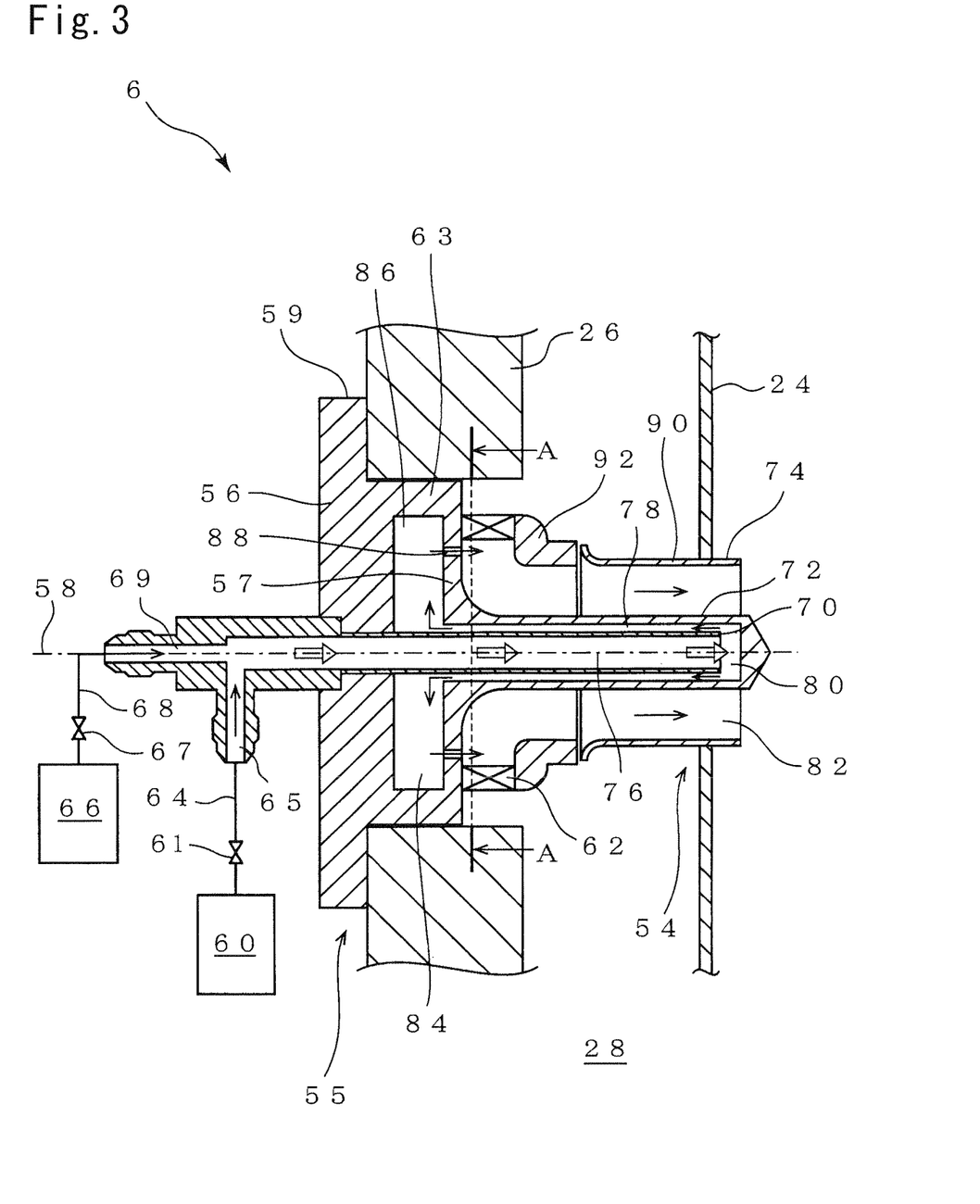
FIG. 3 is a partial enlarged view of FIG. 2, showing a supplemental burner according to a first embodiment of the present invention.
Figure 4:
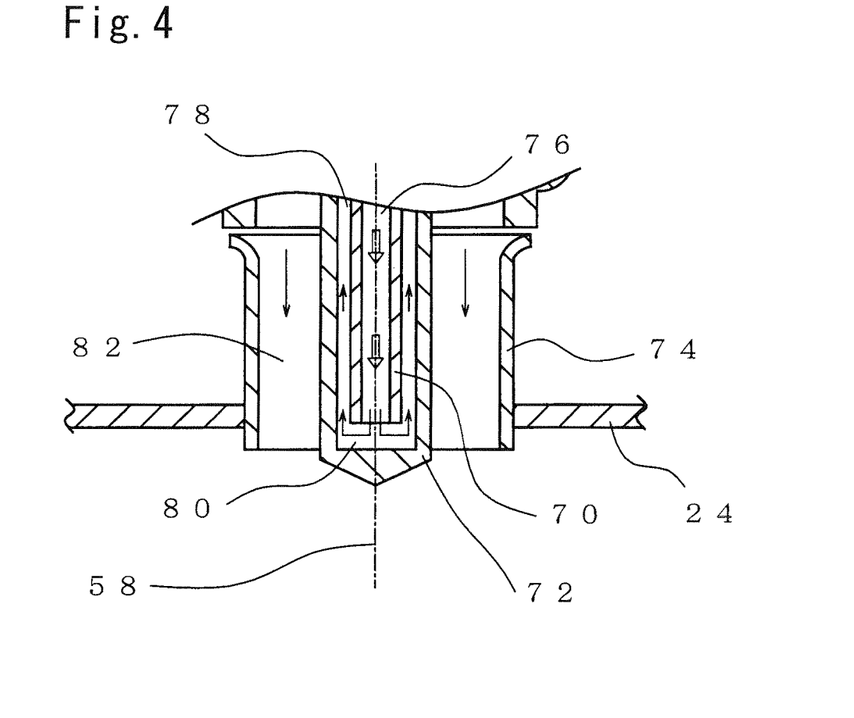
FIG. 4 is an enlarged view of a portion near a combustion chamber of FIG. 3.
Figure 5:
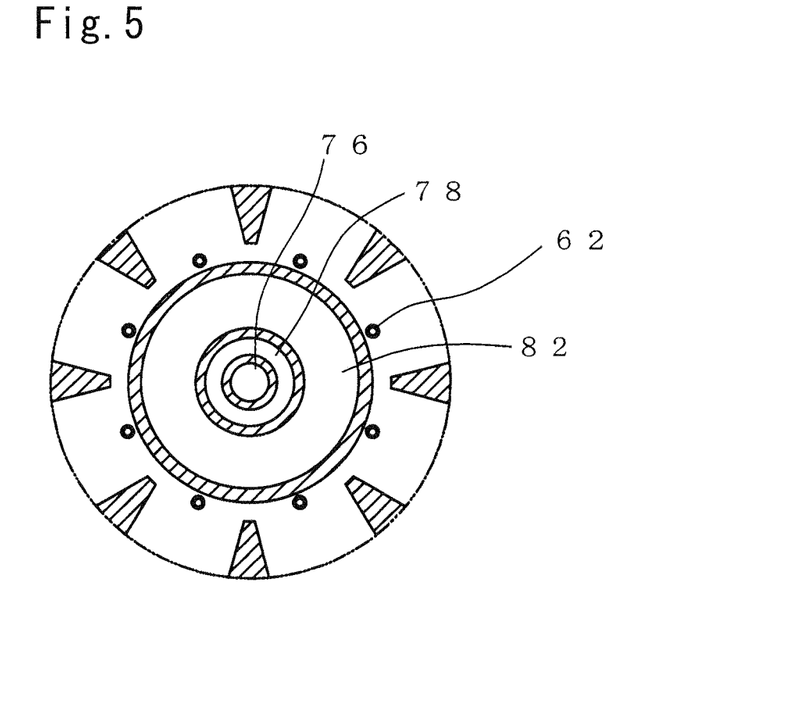
FIG. 5 is a transverse sectional view taken along line A-A in FIG. 3.

The configuration of the supplemental burner 6 will be described in detail with reference to FIGS. 3 to 5. FIG. 3 is a partial enlarged view of the supplemental burner 6 according to the first embodiment of the present invention. FIG. 4 is an enlarged view of a portion near the combustion chamber of FIG. 3. FIG. 5 is a cross-sectional view taken along A-A indicated by arrows of FIG. 3.

As shown in the figures, the supplemental burner 6 is configured to inject a mixture of fuel and air (premixed gas) from the base end side far from the combustion chamber 48 toward the distal end side close to the combustion chamber 48 and includes three cylindrical parts, i.e., an inner cylinder 70, an intermediate cylinder 72 externally covering the inner cylinder 70, and an outer cylinder 74 externally covering the intermediate cylinder 72, concentrically arranged along the central axis 58. In this embodiment, the outer cylinder 74 is made up of two cylindrical parts 90, 92; however, as described later, the outer cylinder may be made up of one cylindrical part. In this embodiment, the inner cylinder 70, the intermediate cylinder 72, and a portion (the second cylindrical part 92) of the outer cylinder 74 are supported by a header block 56 fixed to the casing 26, and a different portion (the first cylindrical part 90) of the outer cylinder 74 is supported by the combustion cylinder 24.

Specifically, the inner cylinder 70 is made up of a tube opened at both ends to form a first passage 76 therein and has a base end portion (a left end portion of the figure) held in the header block 56 and a distal end portion (a right end portion of the figure) located near the combustion cylinder 24. The base end side of the inner cylinder 70 branches into a first fuel supply path 65 branching from the first passage 76 toward the base end side and a second fuel supply path 69. The first fuel supply path 65 and the second fuel supply path 69 are respectively connected to the first fuel supply source 60 and the second fuel supply source 66 through pipings 64, 68. As shown in the figure, respective flow regulating valves 61, 67 are provided in the pipings 64, 68 and, preferably, a ratio of the first fuel supplied from the first fuel supply source 60 and the second fuel supplied from the second fuel supply source 66 can be adjusted by operating these flow regulating valves 61, 67. In this embodiment, the first fuel is a natural gas and the second fuel is a hydrogen gas. The first fuel supply path 65 and the second fuel supply path 69 constitute a fuel supply part of the present invention.

The intermediate cylinder 72 is formed integrally with the header block 56 and forms an annular second passage 78 around the inner cylinder 70. As shown in the figure, a distal end portion of the intermediate cylinder 72 is closed and forms with the distal end of the inner cylinder 70 a first link passage 80 allowing communication between the first passage 76 and the second passage 78. The first passage 76, the second passage 78, and the first link passage 80 constitute a fuel passage of the present invention. The base end portion of the intermediate cylinder 72 is supported by a partition wall 57 forming a portion of the header block 56. As shown in the figure, the header block 56 has a base part 59 fixed to the casing 26, a cylindrical part 63 fitted to a through-hole 55 formed in the casing 26, and the partition wall 57 coupled to a distal end of the cylindrical part 63, and forms a cylindrical coupling chamber 86 surrounding the periphery of the inner cylinder 70 between the base part 59 and the partition wall 57, and the base end of the second passage 78 is connected to the coupling chamber 86. The header block 56 also includes a second cylindrical part 92 concentrically surrounding the base end side of the intermediate cylinder 72. As described above, the second cylindrical part 92 is coaxially disposed close to the first cylindrical part 90 supported by the combustion cylinder 24, and the outer cylinder 74 is made up of these cylindrical parts 92 and 90 with a third passage 82 formed inside the outer cylinder 74 (the cylindrical parts 92 and 90).

In the partition wall 57 of the header block 56, a plurality of injection holes 88 penetrating the partition wall 57 is formed at equal intervals on a circumference around the central axis 58, so that the coupling chamber 86 and the third passage 82 communicate with each other through the injection holes 88. As shown in FIG. 5, in this embodiment, the eight injection holes 88 are formed. As shown in FIGS. 3 and 5, a plurality of air supply holes (air supply parts) 62 corresponding to the injection holes 88 is formed in the second cylindrical part 92, so that the combustion air flow path 28 and the third passage 82 communicate with each other. In this embodiment, the eight air supply holes 62 are provided in conformity to the number of the injection holes 88. The air supply holes 62 are arranged in line with the respective injection holes 88 with respect to the radial direction of the central axis 58.

The operation of the supplemental burner 6 having the configuration described above will hereinafter be described with reference to FIGS. 3 to 5. The supplemental burner 6 supplies both the first fuel and the second fuel supplied from the first fuel supply passage 64 and the second fuel supply passage 68 into the first passage 76. The supplied first and second fuels are mixed in the first passage 76. The mixed fuels (hereinafter referred to as "mixed fuel") enter the first link passage 80 from the distal end of the first passage 76 and then turn back to flow into the second passage 78. The mixed fuel supplied to the second passage 78 is sent from the distal end toward the base end and enters the second link passage (fuel introduction part) 84. The mixed fuel in the second link passage 84 is injected through the injection holes 88 into the third passage 82. The mixed fuel injected into the third passage 82 is sent to the distal end side in the third passage 82 together with the combustion air supplied from the air supply holes 62 and is mixed with the combustion air on the way, turning into a premixed gas (mixture). This premixed gas is injected from the distal end of the third passage 82 into the combustion chamber 48 for premixed combustion and the secondary combustion region 96 is formed.

In this way, in the supplemental burner 6 of the present invention, the fuel flows inside the first passage 76, the first link passage 80, and the second passage 78 and, in so doing, comes into contact the intermediate cylinder 72 to cool the intermediate cylinder 72. Therefore, even if a flame in the combustion chamber 48 enters the third passage 82, the flame is extinguished when coming into contact with the cooled intermediate cylinder 72. Therefore, the supplemental burner 6 of the embodiment eliminates the problem of flashback. Particularly, the hydrogen gas has a faster combustion speed than the natural gas. Therefore, a burner combusting a fuel containing the hydrogen gas has a higher possibility of flashback as compared to a burner combusting only the normal natural gas as a fuel. However, by adopting the supplemental burner 6 having such a flashback prevention function, a high concentration hydrogen gas unusable in a usual burner because of the possibility of flashback can be used as a fuel. Additionally, a burner combusting a mixed fuel may locally generate a high temperature region because fuels are not uniformly mixed with each other, and may result in an increase in amount of NOx emission. However, the supplemental burner of the present invention has a longer flow path length ensured by the turn-back structure of the fuel flow path and therefore can promote the uniform mixing of a hydrogen gas and a hydrocarbon gas and can suppress the formation of the local high temperature region during combustion so that the amount of NOx emission can be reduced.

The fuel used for each of the burners is a hydrocarbon fuel containing 80 vol % or more hydrocarbons in volume ratio to the whole of the first fuel. In this embodiment, the hydrocarbon fuel used as the first fuel is a natural gas containing, for example, 88.9% methane $CH_4$. Examples of the hydrocarbon fuel include a natural gas as well as a liquefied natural gas (liquefied natural gas). Other liquid fuels such as kerosene and light oil may also be used. For the second fuel, a gas containing hydrogen at a high concentration of 50 vol % or more in volume ratio to the whole of the second fuel is used. For example, a hydrogen gas alone or a gas acquired by mixing a methane gas with a hydrogen gas is used.

Figure 6:
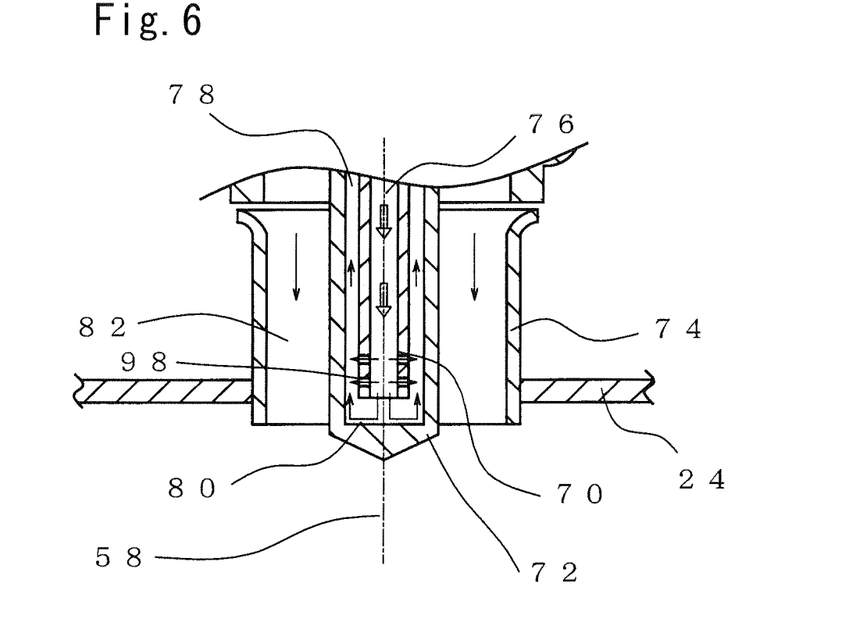
FIG. 6 is a partial enlarged view of FIG. 3 using a supplemental burner with a first link passage different from that of FIG. 4.

The supplemental burner 6 of this embodiment described above can variously be modified. For example, as shown in FIG. 6, a plurality of communication holes (communication parts) 98 penetrating the inner cylinder 70 and allowing communication between the first passage 76 and the second passage 78 may be formed in a distal end region of the inner cylinder 70. Preferably, a plurality of the (e.g., four) communication holes 98 is provided at equal intervals on the circumference of the inner cylinder 70 around the central axis 58. With such a configuration, the mixed fuel flowing into the second passage 78 through the first link passage 80 is disturbed by the mixed fuel injected from the plurality of the communication holes 98 so that the mixture of the hydrogen gas and the hydrocarbon gas can further be promoted. Additionally, the uniformly mixed fuel is mixed with the combustion air in the third passage 82 so that a portion with high hydrogen gas concentration is not locally generated. Therefore, a local high-temperature region is not generated during combustion and the amount of NOx emission can consequently be suppressed.

Second Embodiment

Figure 7:
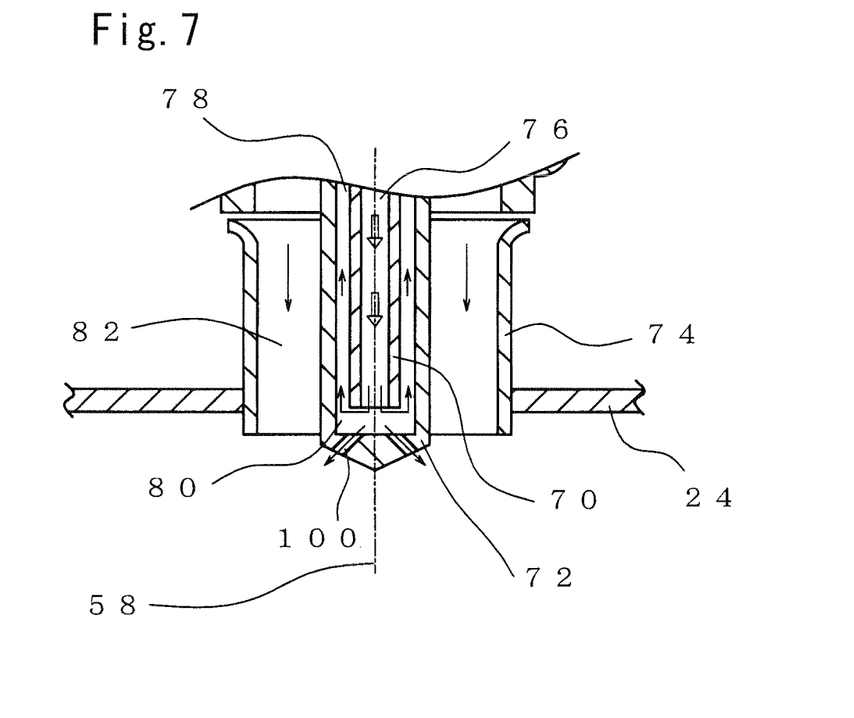
FIG. 7 is an enlarged view of a portion near the combustion chamber of FIG. 3 in the case of using a supplemental burner according to a second embodiment of the present invention.
Figure 8:
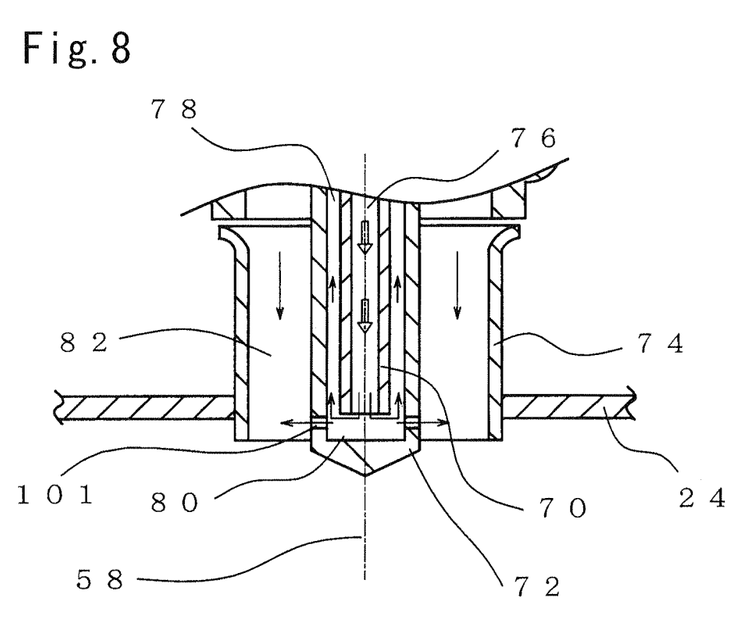
FIG. 8 is an enlarged view of a portion near the combustion chamber of FIG. 3 using a supplemental burner provided with communication holes at positions different from those of FIG. 7.

FIGS. 7 and 8 are enlarged views of a portion near the combustion chamber 48 of the supplemental burner 6 according to the second embodiment. The constituent elements other than portions related to the distal end side of the supplemental burner 6 are the same as those of the first embodiment of FIG. 3. Therefore, the same portions as the constituent elements shown in FIG. 3 are denoted by the same reference numerals and will not be described. Referring to FIG. 7, the supplemental burner 6 of this embodiment has a plurality of communication holes (communication parts) 100 obliquely penetrating the intermediate cylinder 72 in the distal end region of the intermediate cylinder 72 to allow communication between the first link passage 80 and the combustion chamber 48. As shown in FIG. 8, the communication holes 100 may be communication holes 101 perpendicularly penetrating the intermediate cylinder 72 to allow communication between the first link passage 80 and the third passage 82. Preferably, a plurality of the (e.g., four) communication holes 100, 101 is provided at equal intervals on the circumference of the intermediate cylinder 72 around the central axis 58.

With such a configuration, the mixed fuel is injected from two locations; the injection holes 88 on the base end side and the communication holes 100, 101 on the distal end side. The injection of the mixed fuel through the injection holes 88 on the base end side is injected into the third passage 82 and the injection of the mixed fuel through the communication holes 100, 101 is either injected from the first link passage 80 into the combustion chamber 48 or diffusely injected to a distal end portion of the third passages 82. With regard to a proportion of injection amounts from the injection holes 88 and the communication holes 100, 101, preferably, the injection from the communication holes 100, 101 is less than or equal to 20% of the total injection amount from the injection holes 88 and the communication holes 100, 101. This is because, if the injection amount from the communication holes 100, 101 exceeds 20%, the amount of NOx emission may increase due to diffusion combustion of the fuel diffusely injected from the communication holes 100, 101. Additionally, the fuel injected from the injection holes 88 into the third passage 82 is reduced so that the premixed gas in the third passage 82 can further be made leaner. Therefore, the amount of NOx emission can further be reduced and the fuel load range can accordingly be expanded, so that the usable range of the supplemental burner 6 can be expanded.

Third Embodiment

Figure 9:
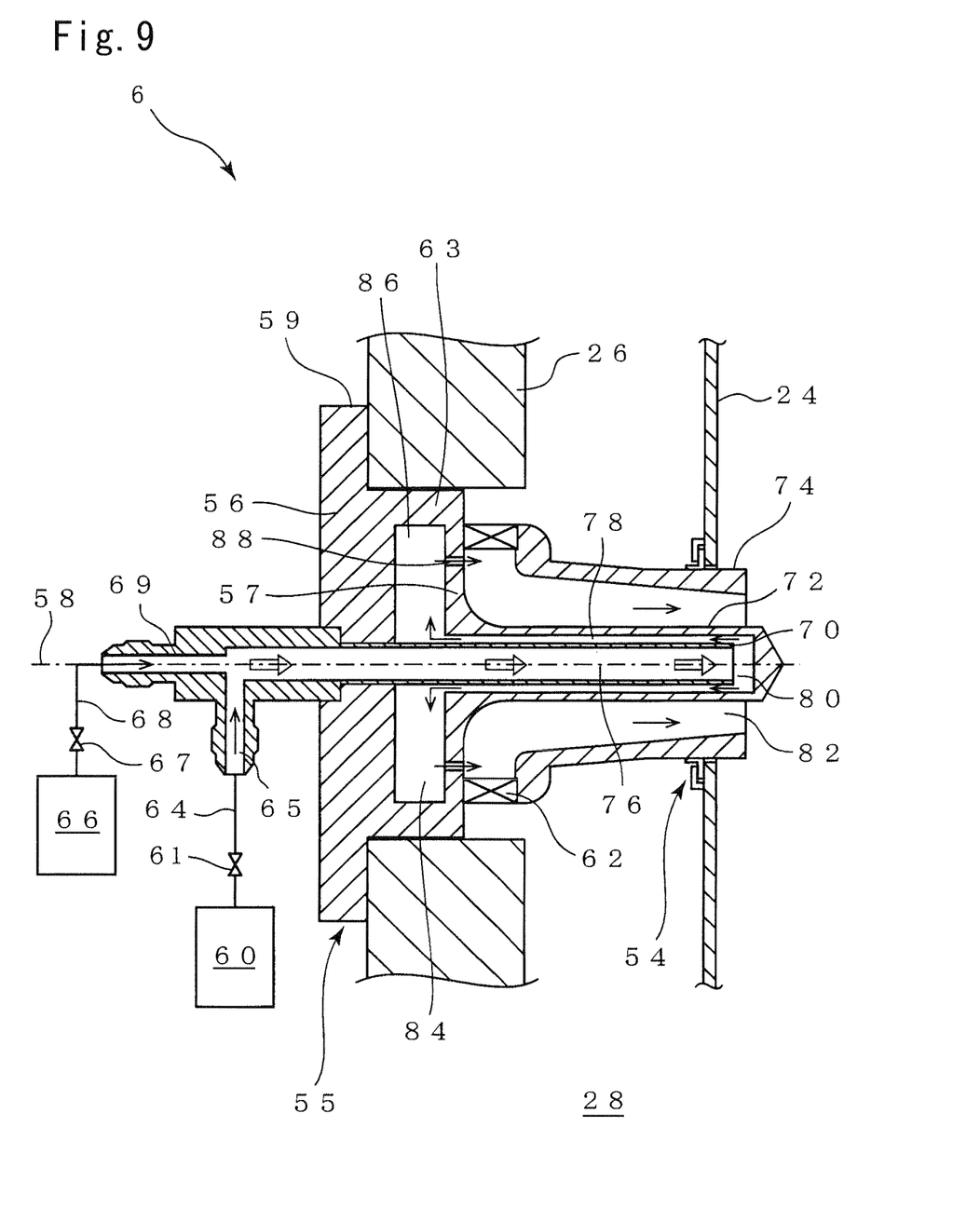
FIG. 9 is a schematic longitudinal sectional view of a supplemental burner according to a third embodiment of the present invention.

FIG. 9 shows the supplemental burner 6 of the third embodiment. The supplemental burner 6 of this embodiment has the same constituent elements as those of the first embodiment of FIG. 3 except portions related to the shape in the distal end side. Therefore, the same portions as the constituent elements shown in FIG. 3 are denoted by the same reference numerals and will not be described.

The supplemental burner 6 of this embodiment is formed such that the inner diameter of the outer cylinder 74 gradually decreases from the base end side to the distal end side (from the left side to the right side of the figure). Therefore, the third passage 82 has a transverse section (cross-section perpendicular to the central axis 58) gradually reduced in size from the base end side to the distal end side.

With such a configuration, since the flashback occurs when the combustion speed exceeds the injection speed of the premixed gas, the outlet flow speed (injection speed) of the premixed gas is increased allowing more reliable prevention of the flashback.

Figure 10:
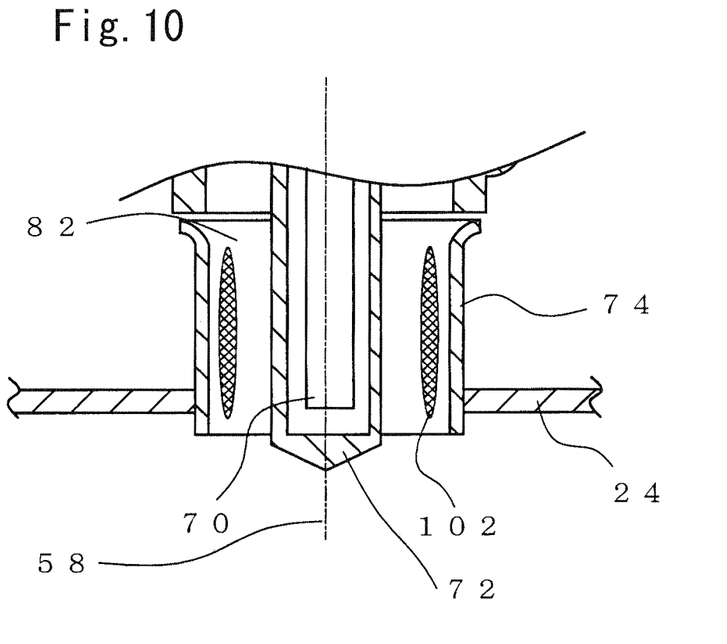
FIG. 10 is a partial enlarged conceptual view of FIG. 3 showing a viscous boundary layer in a third passage according to the first embodiment of the present invention.
Figure 11:
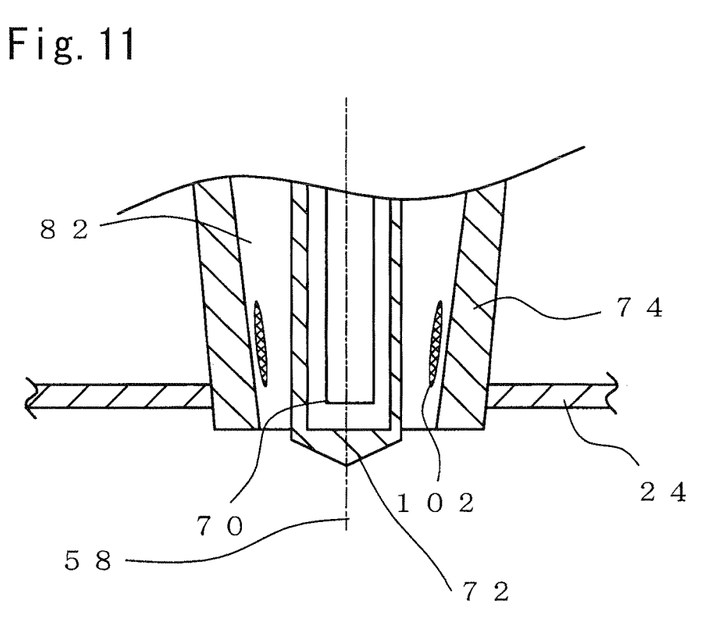
FIG. 11 is a partial enlarged conceptual view of FIG. 10, showing a viscous boundary layer in the third passage according to the third embodiment of the present invention.

FIGS. 10 and 11 conceptually show respective viscous boundary layers 102 near the inner walls of the outer cylinders 74 on the distal end side of the supplemental burner 6 according to the first embodiment and of the supplemental burner 6 according to the third embodiment of the present invention. As shown in these figures, the supplemental burner 6 of the third embodiment (FIG. 11) can more reliably prevent the flashback as compared to the supplemental burner 6 of the first embodiment (FIG. 10) since the injection speed is increased to reduce the viscous boundary layer region 102 that may act as a low flow speed region.

Fourth Embodiment

Figure 12:
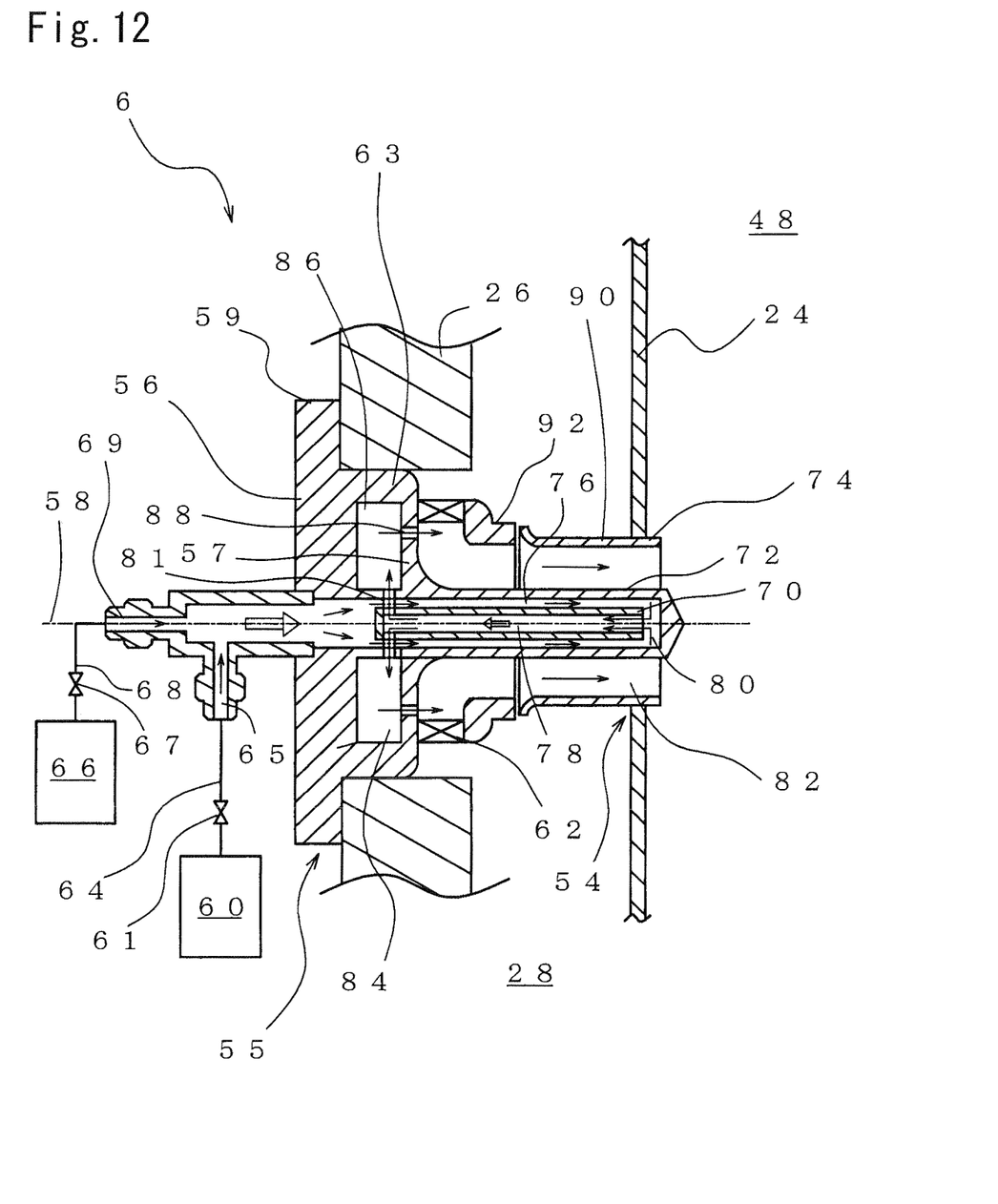
FIG. 12 is a schematic longitudinal sectional view of a supplemental burner according to a fourth embodiment of the present invention.
Figure 13:
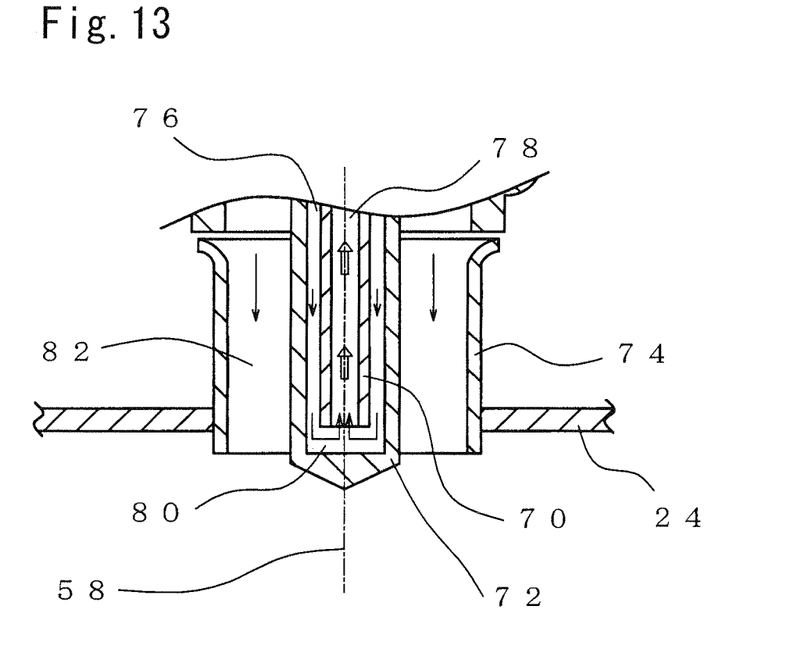
FIG. 13 is an enlarged view of a portion near a combustion chamber of FIG. 12.

FIG. 12 shows a schematic longitudinal sectional view of the supplemental burner 6 according to the fourth embodiment of the present invention. FIG. 13 shows an enlarged view of a portion near the combustion chamber 48 of FIG. 12. The supplemental burner 6 of this embodiment has the same constituent elements as those of the first embodiment of FIG. 3 except portions related to the shape in the distal end side and the vicinity of the coupling chamber 86. Therefore, the same portions as the constituent elements shown in FIG. 3 are denoted by the same reference numerals and will not be described.

As shown in FIGS. 12 and 13, the supplemental burner 6 of this embodiment has the inner cylinder 70 made up of a tube opened on the distal end side and includes a plurality of link tubes 81 fluidly connected to the coupling chamber 86 on the base end side. The second passage 78 is formed inside the inner cylinder 70.

The intermediate cylinder 72 is formed integrally with the header block 56 and forms the annular first passage 76 around the inner cylinder 70. As shown in the figures, the distal end portion of the intermediate cylinder 72 is closed and forms with the distal end of the inner cylinder 70 the first link passage 80 allowing communication between the first passage 76 and the second passage 78. The base end portion of the intermediate cylinder 72 forms the cylindrical coupling chamber 86 surrounding the periphery of the inner cylinder 70, and the link tubes 81 provided at the base end of the second passage 78 are connected to the coupling chamber 86.

The mixed fuel supplied to the first passage 76 reaches the first link passage 80 on the distal end side and then turns back from the outside to the inside in the radial direction of the axis 58 to flow into the second passage 78. The mixed fuel supplied to the second passage 78 flows through the link tubes 81 on the base end side into the coupling chamber 86. As described above, the configuration for turning back the mixed fuel flow at the distal end side of the supplemental burner 6 may be a configuration allowing the flow from outside to inside.

Fifth Embodiment

Figure 14:
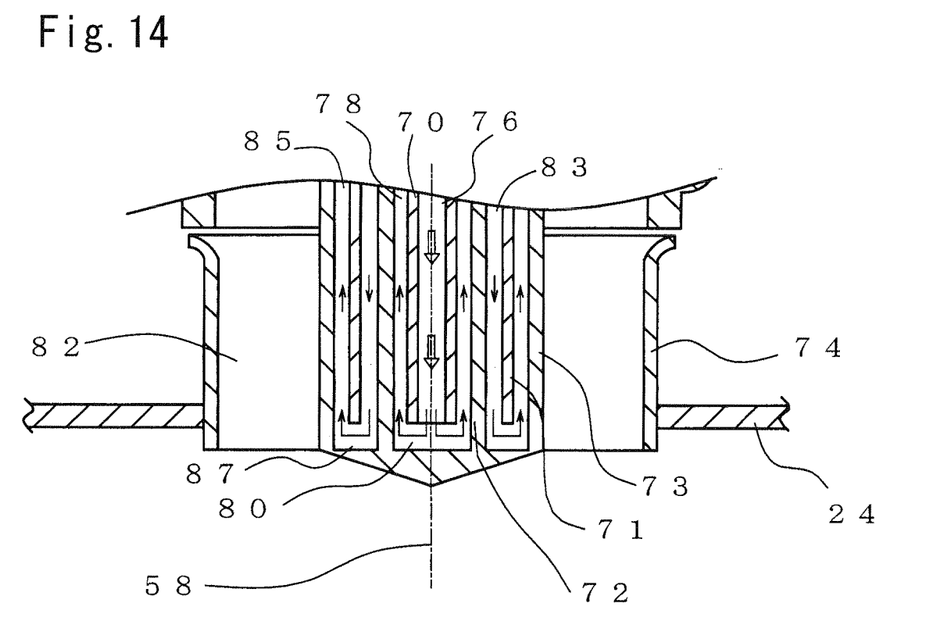
FIG. 14 is a schematic longitudinal sectional view of a portion near a combustion chamber of a supplemental burner according to a fifth embodiment of the present invention.

FIG. 14 is a schematic longitudinal sectional view of a portion near a combustion chamber of a supplemental burner according to the fifth embodiment of the present invention. The supplemental burner 6 of this embodiment has the same constituent elements as those of the first embodiment of FIG. 3 except portions related to the shape in the distal end side. Therefore, the same portions as the constituent elements shown in FIG. 3 are denoted by the same reference numerals and will not be described.

As shown in FIG. 14, the supplemental burner 6 of this embodiment has a second inner cylinder 71 and a second intermediate cylinder 73 provided on the outside of the axis 58 with respect to the inner cylinder 70 and the intermediate cylinder 72. A fourth passage 83 is formed between the intermediate cylinder 72 and the second inner cylinder 71. A fifth passage 85 is formed between the second inner cylinder 71 and the second intermediate cylinder 73. A base end portion of the second inner cylinder 71 is closed and forms with the base end of the intermediate cylinder 72 a third link passage (not shown) allowing communication between the second passage 78 and the fourth passage 83. A distal end portion of the second intermediate cylinder 73 is closed and forms with the distal end of the second inner cylinder 71 a fourth link passage 87 allowing communication between the fourth passage 83 and the fifth passage 85. At the base end of the second intermediate cylinder 73, a second link passage (not shown) linking the fifth passage 85 and the third passage 82 is provided.

The mixed fuel supplied to the first passage 76 reaches the first link passage 80 on the distal end side and then turns back from the inside to the outside in the radial direction of the axis 58 to flow into the second passage 78. The mixed fuel supplied to the second passage 78 reaches the third link passage (not shown) on the base end side and then turns back from the inside to the outside in the radial direction of the axis 58 to flow into the fourth passage 83. The mixed fuel supplied to the fourth passage 83 reaches the fourth link passage 87 on the distal end side and then turns back from the inside to the outside in the radial direction of the axis 58 to flow into the fifth passage 85. The mixed fuel supplied to the fifth passage 85 reaches the second link passage (not shown) on the base end side and is injected through the injection holes (not shown) into the third passage 82. As described above, the configuration turning back the mixed fuel in the supplemental burner 6 may be a configuration including two or more turn-back portions (link passages).

The invention claimed is:

1. A combustor configured to supply a combustion product gas to a turbine, the combustor comprising:
   a combustion cylinder forming a combustion chamber configured to combust a fuel;
   a premixed combustion main burner disposed upstream of the combustion cylinder; and
   a premixed combustion supplemental burner extending through a circumferential wall portion of the combustion cylinder downstream from the premixed combustion main burner, wherein
   the premixed combustion supplemental burner is configured to inject a mixture of the fuel and air from a base end of the premixed combustion supplemental burner toward a distal end of the premixed combustion supplemental burner and into the combustion chamber, the distal end configured to be positioned within the combustion chamber, the base end configured to be positioned further from the combustion chamber than the distal end, the premixed combustion supplemental burner comprising:
   a fuel passage configured to channel the fuel between the base end and the distal end, the fuel passage comprising a first fuel passage portion and a second fuel passage portion, the first fuel passage portion being configured to channel fuel from the base end along a first direction towards the distal end to a turn-back part, the second fuel passage portion configured to receive the fuel from the turn-back part and channel the fuel from the turn-back part along a second direction towards the base end, the turn-back part configured to turn back the fuel from the first direction to the second direction;
   a premixed gas passage surrounding the fuel passage and configured to communicate with the combustion chamber;
   a fuel introduction part positioned closer than the premixed gas passage to the base end, the fuel introduction part configured to receive the fuel from the fuel passage and introduce the fuel into the premixed gas passage along the first direction; and
   an air supply part positioned at the first end of the premixed gas passage and configured to supply the premixed gas passage with air.

2. The combustor according to claim 1, wherein the premixed combustion supplemental burner further comprises a fuel supply part configured to supply the fuel passage with a plurality of fuels including a hydrogen gas fuel.

3. The combustor according to claim 1, wherein the fuel passage has at least one communication aperture configured to communicate between the first portion of the fuel passage and the second portion of the fuel passage, the at least one communication aperture being positioned upstream of the turn-back part with respect to a flow of the fuel along the first direction in the first portion of the fuel passage.

4. The combustor according to claim 1, wherein the turn-back part has at least one second communication aperture configured to supply the combustion chamber with a portion of the fuel received by the turn-back part from the first portion of the fuel passage.

5. The combustor according to claim 1, wherein the premixed gas passage has a transverse section gradually reduced in size along the first direction.

6. The combustor according to claim 1, wherein the fuel introduction part includes a coupling chamber and a plurality of injection holes, the coupling chamber configured to receive the fuel from the second portion of the fuel passage, and the plurality of injection holes are configured to inject the fuel from the coupling chamber into the premixed gas passage.

7. A gas turbine comprising the combustor according to claim 1.

8. A burner configured to inject a mixture of fuel and air from a base end of the burner toward a distal end of the burner and into a combustion chamber, the distal end configured to be positioned within the combustion chamber, the base end configured to be positioned further from the combustion chamber than the distal end, the burner comprising:
   a fuel passage configured to channel the fuel between the base end and the distal end, the fuel passage comprising a first fuel passage portion and a second fuel passage portion, the first fuel passage portion being configured to channel fuel from the base end along a first direction towards the distal end to a turn-back part, the second fuel passage portion configured to receive the fuel from the turn-back part and channel the fuel from the turn-back part along a second direction towards the base end, the turn-back part configured to turn back the fuel from the first direction to the second direction;

a premixed gas passage surrounding the fuel passage and configured to communicate with the combustion chamber, the premixed gas passage extending from a first end of the premixed gas passage to a second end of the premixed gas passage positioned at the distal end of the burner;

a fuel introduction part positioned closer than the premixed gas passage to the base end, the fuel introduction part configured to receive the fuel from the fuel passage and introduce the fuel into the premixed gas passage along the first direction; and an air supply part positioned at the first end of the premixed gas passage and configured to supply the premixed gas passage with air, wherein the fuel passage has at least one first communication aperture configured to communicate between the first portion of the fuel passage and the second portion of the fuel passage, the at least one first communication aperture being positioned upstream of the turn-back part with respect to a flow of the fuel along the first direction in the first portion of the fuel passage, the fuel introduction part includes a coupling chamber and a plurality of injection holes, the coupling chamber configured to receive the fuel from the second portion of the fuel passage, and the plurality of injection holes are configured to inject the fuel from the coupling chamber into the premixed gas passage, and the at least one first communication aperture is located downstream of the coupling chamber with respect to the flow of the fuel along the first direction in the first portion of the fuel passage.

9. The burner according to claim 8, further comprising a fuel supply part configured to supply the fuel passage with a plurality of fuels including a hydrogen gas fuel.

10. The burner according to claim 8, wherein the turn-back part has at least one second communication aperture configured to supply the combustion chamber with a portion of the fuel received by the turn-back part from the first portion of the fuel passage.

11. The burner according to claim 8, wherein the premixed gas passage has a transverse section gradually reduced in size along the first direction.

12. A combustor configured to supply a combustion product gas to a turbine, the combustor comprising:
a combustion cylinder forming the combustion chamber and configured to combust a fuel;
a premixed combustion main burner disposed upstream of the combustion cylinder; and
a premixed combustion supplemental burner configured to penetrate through circumferential wall portion of the combustion cylinder downstream from the premixed combustion main burner,
wherein the premixed combustion supplemental burner is the burner according to claim 8.

13. A gas turbine comprising the combustor according to claim 12.

* * * * *